United States Patent
Larsson

[11] Patent Number: 5,996,637
[45] Date of Patent: Dec. 7, 1999

[54] PROTECTIVE DEVICE FOR FLEXIBLE HOSES

[76] Inventor: Nils Larsson, Dalavägen 50, Västra Frölunda, Sweden, 421 68

[21] Appl. No.: 09/011,871
[22] PCT Filed: Oct. 17, 1996
[86] PCT No.: PCT/SE96/01319
  § 371 Date: Feb. 17, 1998
  § 102(e) Date: Feb. 17, 1998
[87] PCT Pub. No.: WO97/14906
  PCT Pub. Date: Apr. 24, 1997

[30] Foreign Application Priority Data

Oct. 19, 1995 [SE] Sweden .................................. 9503660

[51] Int. Cl.⁶ ................................................ F16L 57/00
[52] U.S. Cl. ......................... 138/110; 138/96 R; 138/109
[58] Field of Search ................................ 138/110, 967, 138/96 R, 109

[56] References Cited

U.S. PATENT DOCUMENTS

| | | | |
|---|---|---|---|
| 2,882,072 | 4/1959 | Noland | 138/109 |
| 3,109,461 | 11/1963 | Wolff et al. | 138/110 |
| 3,354,742 | 11/1967 | Tschanz et al. | 138/109 |
| 3,621,623 | 11/1971 | Downes | 138/96 R |
| 4,386,629 | 6/1983 | Cook et al. | 138/110 |
| 4,682,707 | 7/1987 | Wiles | 138/89 |

FOREIGN PATENT DOCUMENTS

| | | |
|---|---|---|
| 2204240 | 8/1972 | Germany . |
| 500365 | 6/1994 | Sweden . |
| 2149049 | 6/1985 | United Kingdom . |

*Primary Examiner*—James F. Hook

[57] ABSTRACT

Protection device for flexible hoses, in particular shower hoses, which device is intended to prevent the hose (12) from collapsing when being bent close to the connector end of the hose. The device includes a socket shaped nipple (14) capable of being inserted into the hose and a resilient portion (16) connecting thereto. The nipple (14) and the resilient portion (16) are manufactured in one piece from a plastic material. The resilient portion (16) is constituted by a nipple comprising radial apertures (17) extending over a major part of its circumference and thin, at least partially annular wall segments (18) between these. The apertures (17) are so deep that the connection between the wall segments is implemented by thin bridges (19) arranged axially disposed in relation to the bridges (19) in the adjacent apertures (17).

13 Claims, 1 Drawing Sheet

PROTECTIVE DEVICE FOR FLEXIBLE HOSES

The present invention relates to a protection device for flexible hoses, in particular shower hoses, which device is intended to prevent the hose from collapsing when being bent adjacent the connector end of the hose, and which device includes a socket shaped nipple capable of being inserted into the hose and a resilient means connecting thereto, whereby the nipple and the resilient means are manufactured in one piece from a plastic material or similar, and the resilient means is constituted by a stiffening part having a high radial strength and being flexible all around without collapsing.

BACKGROUND OF THE INVENTION

Today, shower hoses are mainly manufactured from a plastic material, which softens when warm water flows through the hose. The hose becomes thereby easier to handle and more flexible, but if the water is very warm the hose will lose its firmness, which leads to that it easily collapses, i.e. when bent, it folds so that the water is stopped.

However, this problem was solved by the device disclosed in SE 500 365 C2, in which a socket shaped nipple was attached to a coil spring, which is freely movable in the hose, but this device is relatively expensive to manufacture and to mount. It must consist of non corrosive material, and since the price of shower hoses is pressed down the above mentioned device results in a significant price increase.

THE PURPOSE AND MOST CHARACTERISING FEATURES OF THE INVENTION

The purpose of the invention is to provide a cheap but at the same time efficient solution to the problem of collapsing, where mounting and therefore a manual work operation is not required as in the case of the non corrosive coil spring. These objects have been solved by the stiffening part being constituted by a socket comprising radial apertures extending over a major part of its circumference and thin, at least partially annular wall segments between these, and which apertures are so deep that the connection between the wall segments is implemented by thin bridges arranged axially disposed in relation to the bridges in the adjacent apertures.

DESCRIPTION OF THE DRAWINGS

The invention will be further described below referring to the appended drawings presenting a preferred embodiment.

DESCRIPTION OF PREFERRED EMBODIMENTS

Figure 1:
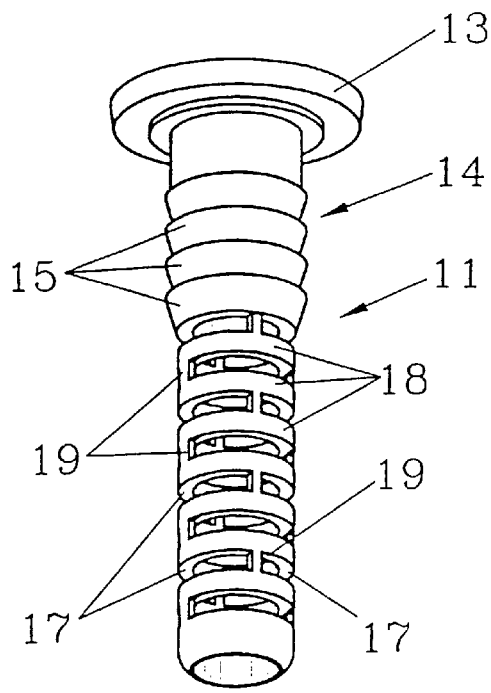
FIGS. 1 and 2 show in perspective a protection device according to the invention from below and from above, and in FIG. 3 in a longitudinal cut, with a mounted hose.
Figure 2:
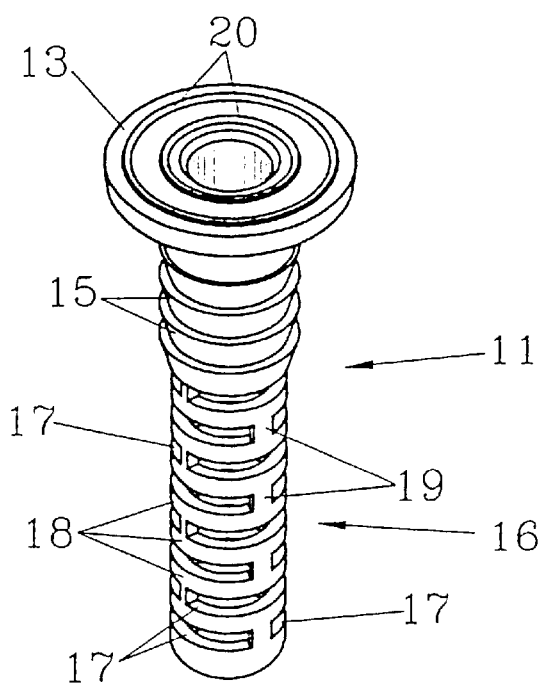
Figure 3:
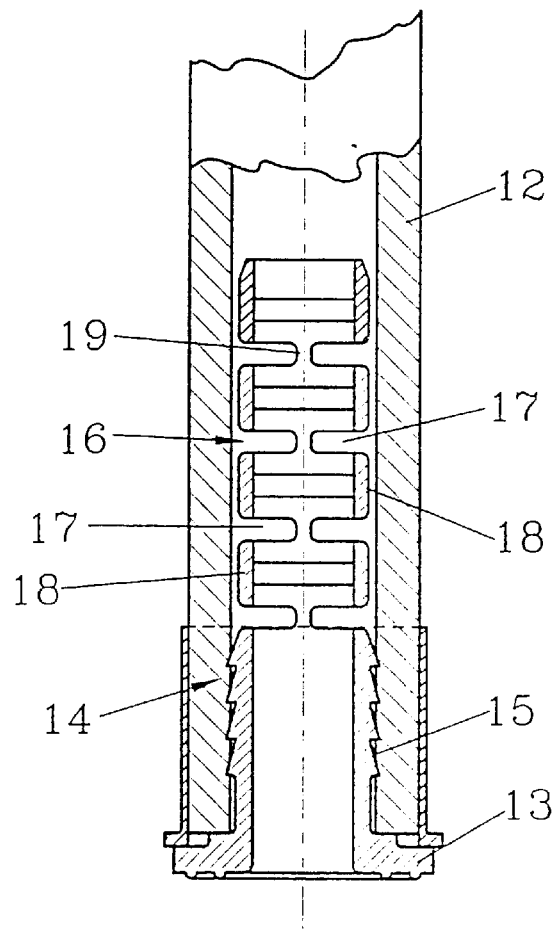

As presented by the drawings, the protection device consists of a socket 11, intended to be inserted into the end section of a hose 12, and which in one end is provided with a flange 13, which limits the insertion depth of the protection device. Closest to the flange 13 the socket is shaped as a nipple or a hose attachment 14, in the form of circumferential barb-like grooves 15, which interact with an outer socket having the purpose of aggravating the removal of the hose from the protection device. At its end facing away from the flange the hose attachment 14 continues as a flexible stiffening part in the form of a resilient means 16, with an outer diameter slightly less than the inner diameter of the hose 12, so that the resilient means 16 can move freely within the hose.

The resilient, socket shaped means 16 and the hose attachment 14 with the flange 13 are manufactured in one piece from a plastic material, preferably Pa 6.6 and in order to obtain the desired resilient flexibility without collapsing the means is provided with radial apertures 17 and annular wall segments 18 situated therebetween, whereby the apertures 17 have such long extensions along the mantle surface of the socket, that only thin bridges 19 remain, which connect the annular wall segments 18 to each other. The bridges 19 are arranged axially displaced in relation to the bridges in the adjacent aperture 17, and suitably each wall segment 18 is connected to another wall segment via two diametrically opposed arranged bridges 19. In spite of its rather high rigidity, the resilient means designed in that way, can be bent in all directions without collapsing.

At the end surface of the flange 13 are arranged coaxial, annular elevations 20, intended to engage a seal (not shown).

The invention is not limited by the presented preferred embodiment, but a plurality of variations are conceivable within the scope of the claims. Thus, the stiffening part can have a different form than the one shown.

I claim:

1. A protection device for flexible hoses, in particular shower hoses, which device is intended to prevent the hose from collapsing when being bent adjacent to the connector end of the hose, and which device includes a socket capable of being inserted into the hose including a solid nipple portion and a resilient means connected thereto, whereby the nipple and the resilient means are manufactured in one piece from a plastic material or similar, and the resilient means including a stiffening part having a high radial strength and being flexible all around without collapsing, comprising:
   a solid nipple portion;
   a resilient portion connected to the nipple portion, the resilient portion including a stiffening part comprising:
      radial apertures extending a major part of its circumference and thin, at least partially annular wall segments between these, and which apertures are so deep that the connection between the wall segments is constituted by thin bridges arranged axially disposed in relation to the bridges in the adjacent apertures.

2. A protection device according to claim 1, wherein each annular wall segment is connected to the most adjacent wall segment via at least two diametrically opposed bridges.

3. A protection device according to claim 1, wherein one end of the nipple is provided with a flange, the width of which corresponds at least to the wall thickness of the hose, and is preferably slightly larger than the diameter of the hose.

4. A protection device according to claim 3, wherein the end side of the flange is provided with concentric, annular shaped elevations.

5. A protection device according to claim 1, wherein the nipple is equipped with barb-like, circumferential grooves.

6. A protection device for flexible hoses, in particular shower hoses, which device is intended to prevent the hose from collapsing when being bent adjacent to the connector end of the hose, and which device includes a socket capable of being inserted into the hose including a solid nipple portion and a resilient means connected thereto, whereby the nipple and the resilient means are manufactured in one piece from a plastic material or similar, and the resilient means including a stiffening part having a high radial strength and being flexible all around without collapsing, comprising:

a solid nipple portion;

a resilient portion connected to the nipple portion, the resilient portion including a stiffening part comprising:

radial apertures extending a major part of its circumference and thin, at least partially annular wall segments between these, and which apertures are so deep that the connection between the wall segments is constituted by thin bridges arranged axially disposed in relation to the bridges in the adjacent apertures; and means for engaging and securing the stiffening part to an inner portion of the hose.

7. A protection device according to claim 6, wherein said means for engaging and securing the stiffening part include barb-like, circumferential grooves in a spaced apart relationship disposed on the nipple portion of the socket.

8. A protection device according to claim 6, wherein each annular wall segment is connected to the most adjacent wall segment via at least two diametrically opposed bridges.

9. A protection device according to claim 6, further comprising a flange on one end of the nipple, the width of the flange corresponding at least to the wall thickness of the hose, and is preferably slightly larger than the diameter of the hose.

10. A protection device according to claim 9, wherein said means for securing include barb-like, circumferential grooves in a spaced apart relationship disposed on one end of the nipple closest to the flange.

11. A method of reinforcing a hose, comprising:

inserting into an inner portion of the hose a protection device for flexible hoses, in particular shower hoses, which device is intended to prevent the hose from collapsing when being bent adjacent to the connector end of the hose, and which device includes a socket capable of being inserted into the hose including a solid nipple portion and a resilient means connected thereto, whereby the nipple and the resilient means are manufactured in one piece from a plastic material or similar, and the resilient means including a stiffening part having a high radial strength and being flexible all around without collapsing, wherein the stiffening comprises radial apertures extending a major part of its circumference and thin, at least partially annular wall segments between these, and which apertures are so deep that the connection between the wall segments is constituted by thin bridges arranged axially disposed in relation to the bridges in the adjacent apertures.

12. A method of reinforcing a hose according to claim 11, further comprising, inserting means for securing said stiffening part to an inner portion of the hose, the means being disposed on the nipple portion of the socket.

13. A method of reinforcing a hose according to claim 12, wherein said means for securing include barb-like, circumferential grooves in a spaced apart relationship disposed on the nipple portion of the socket.

* * * * *